United States Patent [19]

Pizzuto et al.

[11] Patent Number: 4,592,143
[45] Date of Patent: Jun. 3, 1986

[54] RECIPROCATING TRIMMING APPARATUS

[76] Inventors: Russell Pizzuto, 332 Holly Rd.; Alfred Schiazza, III, 608 Hardin St., both of Easton, Md. 21601

[21] Appl. No.: 597,736

[22] Filed: Apr. 6, 1984

[51] Int. Cl.$^4$ ............................................. B26B 19/02
[52] U.S. Cl. ........................................ 30/216; 30/223
[58] Field of Search ................. 30/216, 219, 220, 221, 30/222, 223, 224, 208, 209, 210, 211, 225

[56] References Cited

U.S. PATENT DOCUMENTS

| | | | |
|---|---|---|---|
| 470,578 | 3/1892 | Kidd | 30/217 X |
| 1,832,993 | 11/1931 | Masek | 30/216 X |
| 2,558,459 | 6/1951 | Podner | 30/220 |
| 2,763,925 | 9/1956 | Asbury | 30/220 |
| 3,143,798 | 8/1964 | Lundquist | 30/166 |
| 3,193,925 | 7/1965 | Hawley | 30/223 X |
| 3,293,746 | 12/1966 | Maxson | 30/223 |
| 3,538,693 | 11/1970 | Hast | 30/224 |
| 3,623,223 | 11/1971 | Edgell | 30/222 |
| 3,751,805 | 8/1973 | Grahn | 30/220 |
| 3,848,401 | 11/1974 | Hast | 30/221 |

FOREIGN PATENT DOCUMENTS 654733  6/1951  United Kingdom ................ 30/208

Primary Examiner—Jimmy C. Peters
Attorney, Agent, or Firm—Finnegan, Henderson, Farabow, Garrett & Dunner

[57] ABSTRACT

Concave curve-shaped stem capturing recesses are provided in edges of stem guiding slots in non-blade carrying member of a rechargeable, battery powered reciprocating hedge and shrub trimmer. The recesses have portions presenting acute stem contact angles to the guided stems, which portions extend inward from about the location of the blade tip a distance greater than about 50% of the effective blade height.

15 Claims, 9 Drawing Figures

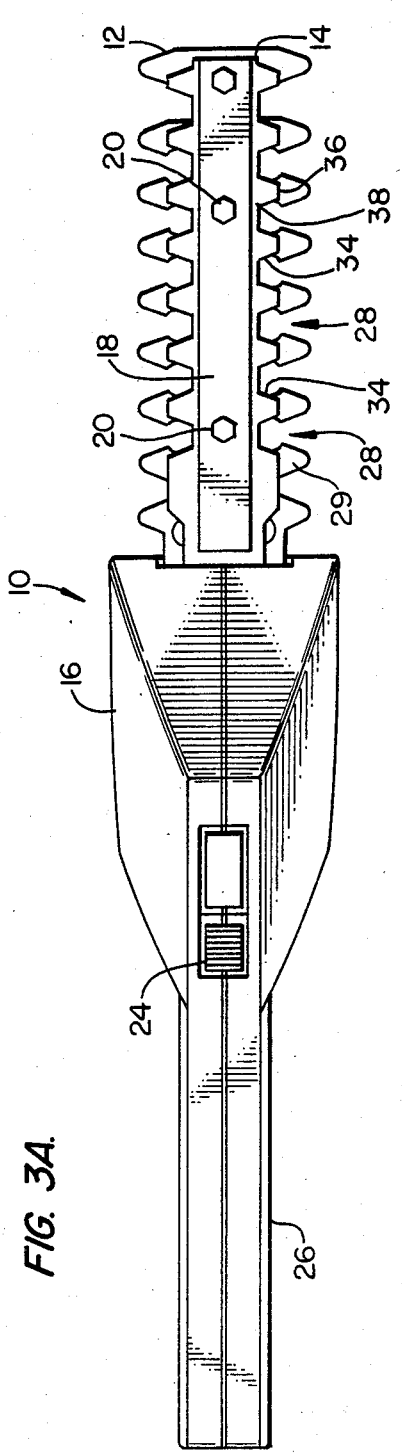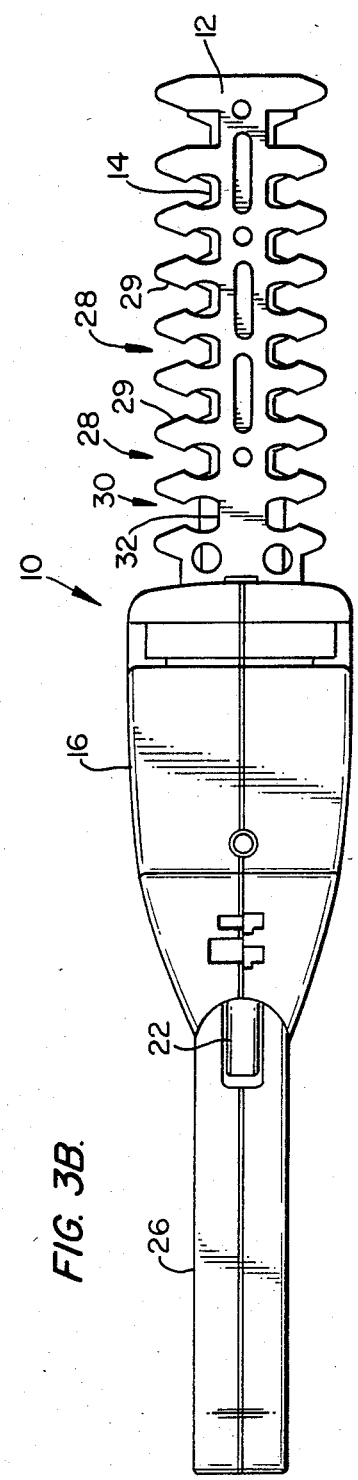

RECIPROCATING TRIMMING APPARATUS

BACKGROUND OF THE INVENTION

1. Field of The Invention

The present invention relates to improvements in powered, hand-held apparatus of the type having a pair of reciprocating cutting members, for trimming hedges, shrubs, and the like.

2. Description of The Prior Art

Hand-held trimming devices of the type described above are well known in the gardening tool art. Such devices are conventionally electrically powered and can be equipped with a cord extension for accepting externally provided power or can be completely self-contained, having a rechargeable battery pack. A schematic diagram of a conventional electrically powered hand-held trimmer appears in FIG. 1 and is designated generally by the numeral 1.

Essentially, trimmer 1 has a stationary elongated member 2 with a plurality of slots 3 disposed generally perpendicular to the longitudinal axis of member 2 for guiding the stems of the hedge or shrub to be trimmed, such as stem 4 depicted in the Figure. A cooperating elongated member designated 5 in the figure includes a plurality of individual blades 6 disposed generally perpendicular to the longitudinal axis of blade carrying member 5 and arranged to alternately cover and uncover the slots 3 upon reciprocation of the blade carrying member 5 in the direction shown by the arrows in FIG. 1. Stem guiding member 2 is generally fixed to a frame in housing 7 which also contains the mechanism (not shown) for reciprocating blade carrying member 5. Frame 7 can also contain a rechargeable battery pack (not shown) for self-contained units. FIG. 1 also shows the successive positions of an individual blade, blade 8a, during one-half cycle of reciprocation, showing the movement of the blade completely across the corresponding stem-guiding slot, as is conventional. It is also known to size the overall lengths of the stem-guiding member 2 and the blade carrying member 5 in accordance with the power capacity of the apparatus.

In conventional trimming apparatus of the type described above, stems which have been guided into the slots by the action of the operator have a tendency to move in a counter direction, that is, in a direction out of the slot upon engagement by the blade member. This tendency is particularly pronounced when the individual blade members are generally trapezoidal in shape, as blade 6 shown in FIG. 1, wherein the resultant force on the stem has a component along the axis of the slot. If the frictional engagement between the stem and the slot and the stem and the blade is insufficient, the stem will tend to move out of the slot and be only partially severed by the action of the blade, or escape cutting entirely. This problem can become particularly acute after periods of prolonged use of the trimming apparatus after the blades have become worn and a greater cutting force is required to sever the stem.

Attempts have been made to control the movement of stems, including the use of blades having recessed, curve-shaped cutting edges. However, production costs for such intricate blade shapes can be prohibitively high, and any sharp corner projections on the moving blades will have a tendency to "spear" and mangle the stems rather than cut them cleanly.

FIG. 2 shows another prior art attempt to control stem movement. In the FIG. 2 apparatus, the edges defining the individual stem guide slots are equipped with barb-like projections 9 located at approximately the outermost position of the tips of the cutting blades. These barbs have not been entirely successful in preventing the escape of stems from the slots when acted upon by the blades. The stems still can move in the direction out of the slots such that only the portion of the stem inboard of the barbs 9 is actually severed upon passage of the blade. Therefore, the partially cut stems must be acted upon by several passes of an individual blade before being completely severed. As a result, the severed stems typically have a mangled and shredded appearance, and this type of cutting operation is generally unacceptable. Furthermore, while this type of cutting operation might be tolerated when an unlimited power supply is present, the finite power capacity of the self-contained, rechargeable battery operated trimmers requires a more efficient cutting operation.

Specifically, inefficiencies in the cutting operation with conventional trimming apparatus can result in unreasonably short times between recharging and/or the need for larger, heavier power packs. Either condition can make the trimming device commercially unattractive.

SUMMARY OF THE INVENTION

In accordance with the present invention, as embodied and broadly described herein, the improved apparatus for trimming hedges, shrubs and the like, of the kind having a pair of parallel elongated cooperating members, the first of the pair of members having a plurality of slots each having a closed end and an open end, and being oriented generally perpendicular to the axis of elongation for guiding the individual stems of the plant to be trimmed, the second member having a plurality of blades each having a tip and being oriented generally perpendicular to the axis of elongation for shearing the stems upon reciprocation of one of the members relative to the other along the respective axis of elongation, and means positioned at one end of the reciprocating member for effecting the reciprocation, wherein the improvement comprises means associated with the first member for capturing the stems by resisting movement of the guided stems guided in the direction of the slot open end upon contact by the blades, the stem capturing means including recesses formed in the edges of the first member which define the slots, the recesses having recess portions presenting acute stem contact angles to the guided stems, the contact angle being measured from the base of the respective slot to tangents to the recess portion, and wherein each of the acute recess portions extends from about the location of the blade tip inward toward the closed end of the slot a distance at least about 50% of the effective blade height.

Preferably, the blades are trapezoidal in shape, the stem capturing recesses are concave curve-shaped recesses, and the acute stem contact angle portions present a minimum contact angle of about 60° to the captured stems.

It is further preferred that the improved trimming apparatus is electric powered and includes a rechargeable battery pack, and also that the apparatus include an oversized slot for cutting preferentially guided large diameter stems.

The accompanying drawing, which is incorporated in and constitutes a part of this specification, illustrates one embodiment of the invention and, together with the

BRIEF DESCRIPTION OF THE DRAWING

FIGS. 3a and 3b are top and bottom views, respectively, of the improved hand-held, power driven trimmer apparatus of the present invention;

DESCRIPTION OF THE PREFERRED EMBODIMENT

Figure 1:
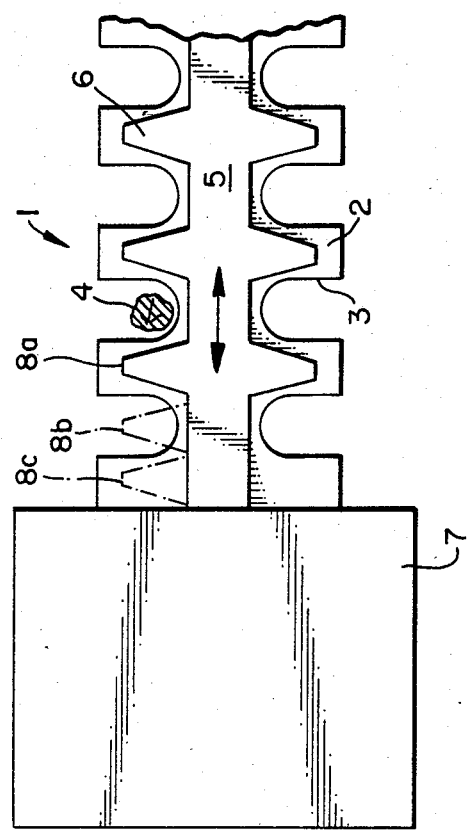
FIG. 1 is a schematic representation of a conventional hand-held power driven reciprocating trimmer apparatus.
Figure 2:
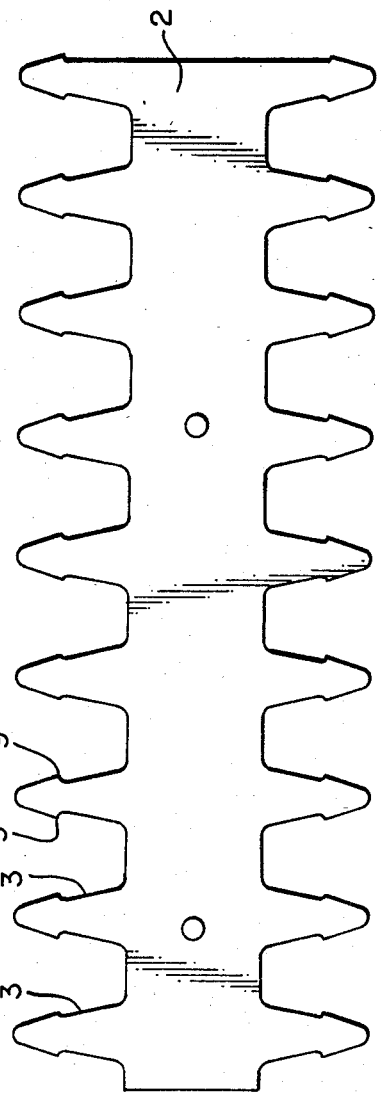
FIG. 2 is a conventional stem guide member such as is used with the apparatus depicted in FIG. 1.
Figure 4A:
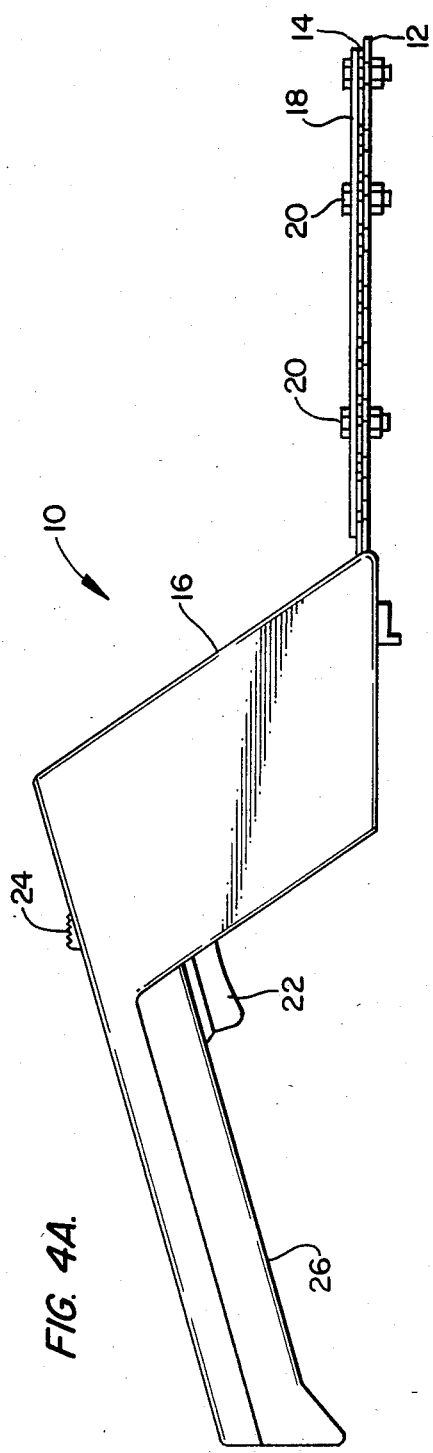
FIGS. 4a, 4b, and 4c are side and end views, respectively, of the trimmer apparatus shown in FIG. 3.
Figure 4C:
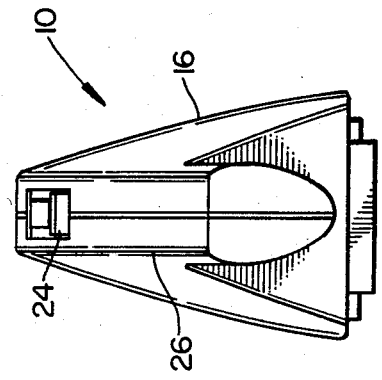
Figure 4B:
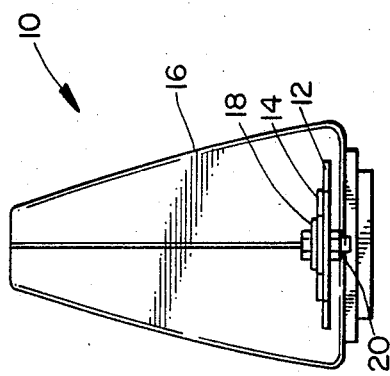

The preferred embodiment of the improved trimmer apparatus of the present invention is shown in FIGS. 3 and 4, and is designated generally by the numeral 10. Trimmer 10 can be used for hedges, shrubs, and the like, and is operated in essentially the same manner as conventional trimmers. The particular embodiment shown in FIGS. 3 and 4 is an electrically powered cordless trimmer having a rechargeable battery pack. However, the present invention is not limited to cordless electric powered trimmers but can encompass electric powered trimmers with cords to supply the electric power and also trimmers powered by internal combustion engines.

As can best be seen in FIGS. 3 and 4, trimmer 10 has a pair of elongated parallel members 12 and 14 which cooperate to cut the hedge and shrub stems. Member 12 is the stem-guiding member and is fixedly attached to a frame (not shown) encased in housing 16. Member 14 is the blade carrying member and is conventionally constrained for sliding movement along the longitudinal axis of the stem-guiding member 12 by keeper plate 18 and bolts 20 which pass through slots (not shown) in blade carrying member 14 and are seated in the stem-guiding member 12.

Blade carrying member 14 is operatively connected to an electric motor means (not shown) positioned within housing 16 for reciprocating member 14 in a manner known to those skilled in the art. Rechargeable electric storage batteries (not shown) of the Nickel-Cadmium type are also enclosed in housing 16. These are intended to provide approximately one-half hour of operation on a single charge for the embodiment shown in FIGS. 3 and 4, but the actual time between charges and projected total cutting area can vary considerably with the type of hedge to be trimmed, speed of the operator, etc. Motor control elements such as trigger switch 22 and safety switch 24 are provided on trimmer 10 as shown in FIGS. 3 and 4, and housing 16 includes handle extension 26 suitably configured for grasping by an operator.

As best seen in FIGS. 3a and 3b, stem-guiding member 12 includes a plurality of stem-guiding slots 28 defined by edges 29, each slot having an open end 30 and a closed end 32 oriented essentially perpendicular to the longitudinal axis of member 12. Blade carrying member 14 includes a plurality of trapezoidal shaped blades 34 each having a tip end 36 and a root end 38. The range of motion of an individual blade 34 is such that it completely traverses the corresponding slot 28, and then returns, during a complete reciprocative cycle, the slot being substantially uncovered at the start, at the mid point, and again at the end of each cycle.

Slots 28 and blades 34 are shown arranged on both sides of members 12 and 14, respectively, but the present invention also is intended to encompass single-sided arrangements. Moreover, although members 12 and 14 are approximately 6 inches long, and the stem-guiding member and the blade carrying member are about 2⅜ inches and 1⅝ inches wide, respectively, in the embodiment shown in FIGS. 3 and 4, the present invention is intended to cover other lengths and widths of the respective members.

In accordance with the present invention, means are provided associated with the stem-guiding member for capturing the guided stems by resisting movement of the guided stems in the direction of the slot open end upon contact by the blades. The stem capturing means includes recesses formed in edges of the stem-guiding member slots, and portions of the recesses present acute stem contact angles to the guided stems from a location at about the blade tip inward for a distance of at least about 50% of the effective blade height.

Figure 5:
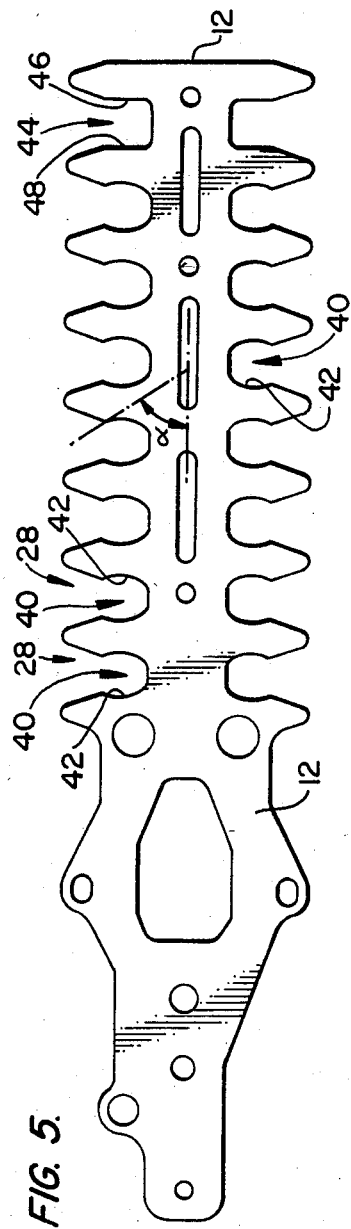
FIG. 5 is a planar view of the stem guide member of the improved apparatus shown in FIG. 3.

As embodied herein, and with reference to FIG. 5 which shows a magnification of stem guide member 12, a plurality of concave-shaped recesses 40 are provided in edges 29 defining slots 28. Inwardly (toward the slot closed end) facing portions 42 of curved recesses 40 serve to contact stems which have been guided into the slots 28 and restrain movement of the stems out of slots 28 when acted upon by the trapezoidal shaped blades 34. Recess portions 42 thus help to insure complete cutting of the stems on a single cutting stroke of the respective blades 34.

The contact angle of the portions 42 of recesses 40, as used herein, is defined by the angle between a tangent drawn to the portion and the axis of stem-guiding member 12, such as angle $\alpha$ depicted in FIG. 5. Acute contact angles, that is, angles less than 90 degrees, will provide an inwardly directed restraining force on the guided stems.

Figure 6:
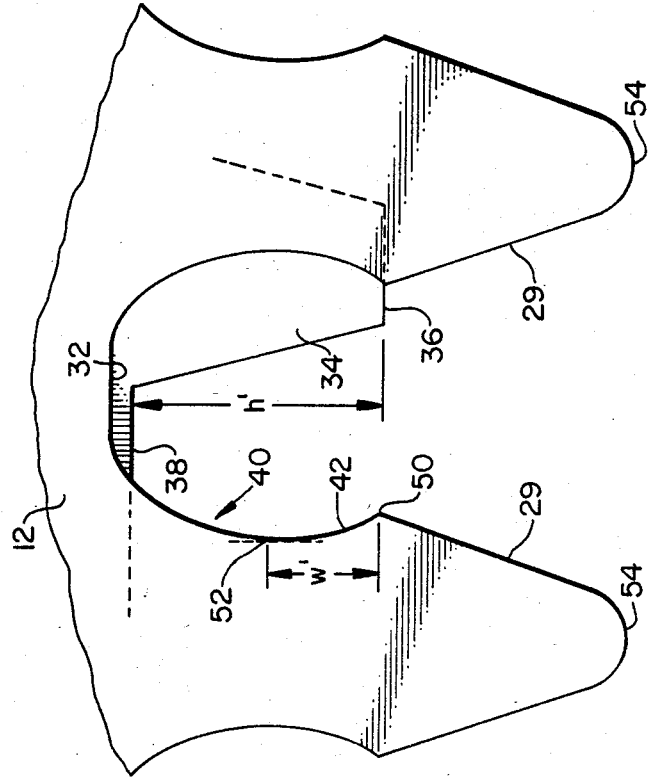
FIG. 6 is a detail of a portion of the guide member shown in FIG. 5.

With reference to FIG. 6 which shows an enlarged detail of the recesses shown in FIG. 5 (with a superimposed blade 34), the recess portion 42 is positioned in the slot 28 to begin at the location of blade tip 36 and to extend inwardly a distance w' of at least about 50% of the effective height h' of blade 34. As shown in FIG. 6, w' is measured from (relative to slot end 32) corner 50 of recessed portion 42 to part 52 of portion 42 where the contact angle reaches 90°.

In the case depicted in FIG. 6 where the longitudinal portion of blade carrying member 14 would be contacted by the guided stem before the closed slot end 32, h' is equal to the actual height of blade 34, namely the perpendicular distance from tip 36 to base 38. In an alternate embodiment (not shown) where the guided stem would first contact the closed slot end 32, the effective blade height h' is equal to the perpendicular distance from the blade tip 36 to the closed slot end 32.

The particular concave curve-shaped recess depicted in FIGS. 5 and 6 has a radius of curvature of about 9 inches, and presents a minimum contact angle of about 60° to a guided stem, with the minimum angle occurring at the location of the blade tip 36. Other radii of curvature and minimum contact angles can be used and still come within the scope of the present invention. Also, other recess shapes could be used to provide the stem-capturing function. It has been found that minimum contact angles significantly less than about 60° can increase the probability of jamming by the captured stems.

Referring again to FIG. 6, edges 29 of stem-guiding member 12 which defines the open end 30 of stem guiding slots 28 are smoothly tapered to rounded tips 54 to provide unobstructed paths for stems into the recessed portions 40 of slots 28. Importantly, tips 36 of blade members 34 should be essentially even with corners 50 of recessed portions 42 in order to minimize spearing as the stems pass into the recessed portions 40.

Tests with trimmers having blade carrying members and stem guiding members made in accordance with the present invention have shown that cleanly severed stems can be obtained, indicating increased cutting efficiency. The resulting increase in cutting efficiency and projected total area cut between charges is especially important for cordless trimmer applications, such as the present preferred embodiment shown in FIGS. 3 and 4.

It is also preferred that cordless embodiments of the trimming apparatus of the present invention include an oversized slot formed without stem capture means for receiving preferentially guided large-diameter stems which could potentially cause stalling or jamming of the apparatus. As best seen in FIG. 5, oversized slot 44 is formed in the end 46 and stem-guiding member 12 distant from the connection with the reciprocating motor means in housing 16. Slot 44 is formed with straight edges 46, 48 having no stem capture recesses or edge portions presenting acute contact angles. Large stems can be preferentially guided by the operator into slot 44 and severed using multiple passes of the respective blades 34. The absence of stem capture recesses 40 from edges 46, 48 of slot 44 allows the stem to move outwardly upon contact by the blade, resulting in only partial cutting for each cutting stroke. Although theoretically an inefficient cutting operation, the oversized slot without capture means is intended to provide for realistic trimming applications encountered by the operator and to accommodate the operator's desire to complete the trimming without resorting to another trimming tool. Thus, the oversize slot without capture means is intended to provide more flexibility to the operator of cordless trimmers having a limited power supply and, in combination with the majority of the slots having stem capture means as described above, the oversized slot provides a significantly improved cordless trimmer apparatus.

It will be apparent to those skilled in the art that various modifications and variations can be made in the trimmer apparatus of the present invention without departing from the scope or spirit of the invention.

What is claimed is:

1. In apparatus for trimming hedges, shrubs and the like, of the kind having two parallel elongated cooperating members, a first of said members having a plurality of slots each having a closed end and an open end, and being oriented generally perpendicular to the axis of elongation for guiding the individual stems of the plant to be trimmed, the second member having a plurality of blades each having a tip and being oriented generally perpendicular to the axis of elongation for shearing the stems upon linear reciprocation of one of the members relative to the other along the respective axis of elongation, and means positioned at one end of the recirpocating member for effecting the reciprocation, the improvement comprising:

means associated with said first member for capturing the stems by resisting movement of the guided stems in the direction of the slot open end upon contact by the blades, said stem capturing means including recesses formed in the edges of the first member which define the slots, said recesses having acute recess portions presenting acute stem contact angles to the guided stems, said contact angle being measured from the axis of elongation to tangents to the edge defining the acute recess portion, said contact angle decreasing to a predetermined minimum along said edge in said direction of the slot open end, and wherein each of said acute recess portions extends from about the location of the blade tip inward toward and closed end of the slot a distance at least about 50% of the effective blade height, each of the plurality of blades having a cutting edge at an angle to said axis of elongation, and wherein the predetermined minimum contact angle is less than said cutting edge angle.

2. Improved apparatus as in claim 1 wherein said stem capturing means are concave curve-shaped recesses.

3. Improved apparatus as in claim 1 wherein the minimum stem contact angle is about 60°.

4. Improved apparatus as in claim 1 wherein the reciprocating means includes a rechargeable, self-contained power source.

5. Improved apparatus as in claim 1 wherein each of the plurality of blades is trapezoidal in shape.

6. Improved apparatus as in claim 1 wherein the slot-defining edges of said first member taper smoothly to rounded tip portions located between the individual slots.

7. Improved apparatus as in claim 1, wherein each of the plurality of blades is trapezoidal in shape.

8. Improved apparatus as in claim 1, wherein said blade has a base extending outwardly of said slot closed end, and wherein said effective blade height is defined by the perpendicular distance from the blade tip to the blade base.

9. Improved apparatus as in claim 1, wherein said effective blade height being defined as the perpendicular distance from said blade tip to said slot closed end.

10. In apparatus for trimming hedges, shrubs and the like, of the kind having two parallel elongated cooperating members, a first of said members having a plurality of slots each having a closed end and an open end, and being oriented generally perpendicular to the axis of elongation for guiding the individual stems of the plant to be trimmed, the second member having a plurality of blades each having a tip and being oriented generally perpendicular to the axis of elongation for shearing the stems upon reciprocation of one of the members relative to the other along the respective axis of elongation, and means positioned at one end of the reciprocating member for effecting the reciprocation, the improvement comprising:

means associated with said first member for capturing the stems by resisting movement of the guided stems in the direction of the slot open end upon contact by the blades, said stem capturing means including recesses formed in the edges of the first member which define the slots, said recesses having acute recess portions presenting acute stem contact angles to the guided stems, said contact angle being measured from the axis of elongation to tangents to the edge defining the acute recess portion, wherein each of said acute recess portions extends from about the location of the blade tip inward toward the closed end of the slot a distance at least about 50% of the effective blade height, wherein the reciprocating means includes a rechargeable, self-contained power source, and wherein said plurality of slots includes at least one oversized slot not having stem capture means, for accepting preferentially guided large diameter stems.

11. Improved apparatus as in claim 10 wherein said at least one slot is located proximate the end of said first member distant from the reciprocating means.

12. In apparatus for trimming hedges, shrubs and the like, of the kind having two parallel elongated cooperating members, a first of said members having a plurality of slots each having a closed end, an open end, and a slot axis and being oriented generally perpendicular to the axis of elongation for guiding the individual stems of the plant to be trimmed, the the second member having a plurality of blades each having a tip and being oriented generally perpendicular to the axis of elongation for shearing the stems upon linear reciprocation of one of the members relative to the other along the respective axis of elongation, and means positioned at one end of the reciprocating member for effecting the reciprocation, the improvement comprising:

means associated with said first member for capturing the stems by resisting movement of the guided stems in the direction of the slot open end upon engagement of the stem by the blades such that said resistance overcomes the component along the slot axis of the resultant force on the stem, said stem capturing means including recesses formed in the edges of the first member which define the slots, said recesses having smooth acute recess portions presenting acute stem contact angles to the guided stems, said contact angles being measured from the axis of elongation to tangents to the recess portion, and wherein each of said acute recess portions extends from about the location of the blade tip inward toward the closed end of the slot a distance at least about 50% of the effective blade height.

13. Improved apparatus as in claim 12, wherein said recess portion edge is curved such that said contact angle decreases from a maximum of less than 90° to a predetermined minimum contact angle.

14. Improved apparatus as in claim 13, wherein each of the plurality of blades being trapezoidal in shape and having a cutting edge at an angle to said axis of elongation, and wherein the predetermined minimum contact angle is less than said cutting edge angle.

15. Improved apparatus as in claim 14, wherein said predetermined minimum contact angle being 60°.

* * * * *

UNITED STATES PATENT AND TRADEMARK OFFICE
CERTIFICATE OF CORRECTION

PATENT NO. : 4,592,143
DATED : June 3, 1986
INVENTOR(S) : Russell Pizzuto et al

It is certified that error appears in the above—identified patent and that said Letters Patent is hereby corrected as shown below:

Please add the following Assignee designation:

--Black & Decker, Inc.
Newark, Delaware

Signed and Sealed this

Twenty-seventh Day of January, 1987

Attest:

DONALD J. QUIGG

Attesting Officer

Commissioner of Patents and Trademarks